United States Patent [19]

Okada

[11] Patent Number: 5,757,510
[45] Date of Patent: May 26, 1998

[54] FACSIMILE MAIL APPARATUS

[75] Inventor: Akihiro Okada, Kawasaki, Japan

[73] Assignee: Fujitsu Limited, Kanagawa, Japan

[21] Appl. No.: 863,932

[22] Filed: May 27, 1997

Related U.S. Application Data

[63] Continuation of Ser. No. 509,796, Aug. 1, 1995, abandoned, which is a continuation of Ser. No. 30,006, filed as PCT/JP92/00909 Jul. 19, 1992 published as WO93/02516 Feb. 4, 1993, abandoned.

Foreign Application Priority Data

Jul. 19, 1991 [JP] Japan .................... 3-179456

[51] Int. Cl.$^6$ .................... H04N 1/00
[52] U.S. Cl. .......... 358/402; 358/440; 358/442; 358/468; 379/100
[58] Field of Search .................... 358/400, 402, 358/434, 440, 442, 468; 379/100; 380/18; H04N 1/00

[56] References Cited

U.S. PATENT DOCUMENTS

| | | | |
|---|---|---|---|
| 4,733,303 | 3/1988 | Koshiishi | 358/400 |
| 4,864,602 | 9/1989 | Yamamoto et al. | 358/434 |
| 4,870,678 | 9/1989 | Adachi | 379/100 |
| 4,961,185 | 10/1990 | Sawada | 358/442 |
| 5,084,770 | 1/1992 | Nakayama | 358/400 |
| 5,121,221 | 6/1992 | Hamano et al. | 358/426 |
| 5,142,568 | 8/1992 | Ogata et al. | 379/100 |
| 5,153,908 | 10/1992 | Kakizawa et al. | 379/157 |
| 5,200,993 | 4/1993 | Wheeler et al. | 358/442 |
| 5,204,895 | 4/1993 | Yoshiura | 379/100 |
| 5,351,136 | 9/1994 | Wu et al. | 358/440 |

FOREIGN PATENT DOCUMENTS

| | | | |
|---|---|---|---|
| 0 378 694 | 7/1990 | European Pat. Off. | |
| 0184867 | 10/1983 | Japan | 358/440 |
| 0101956 | 6/1984 | Japan | 358/440 |
| 63-82141 | 4/1988 | Japan | |
| 63-87045 | 4/1988 | Japan | |
| 2-2268 | 1/1990 | Japan | |
| 2134069 | 5/1990 | Japan | |

OTHER PUBLICATIONS

*Patent Abstracts of Japan*, vol. 12, No. 304 (E–646), Aug. 18, 1988 & JP-A-63 073755 (Nippon Telegr & Teleph Corp, <NTT>), Apr. 4, 1988.

*Patent Abstracts of Japan*, vol. 14, No. 371 (E–963), Aug. 10, 1990 & JP-A–02 134043 (Oki Electric Ind. Co., Ltd.), May 23, 1990.

*Primary Examiner*—Thomas L. Stoll

[57] ABSTRACT

A facsimile mail apparatus having a facsimile information mail service function for the purpose of improving efficiency of facsimile mail delivery including:

storage portions for storing management information indicating correspondences between: a plurality of sending lines for connecting an exchange governing a plurality of facsimile terminals to the facsimile mail apparatus, and a plurality of sending line groups defined according to a predetermined condition; and a delivery management portion for determining a sending line group to be used when sending facsimile information to a plurality of facsimile terminals, by referring to the management information stored in the storage portion.

13 Claims, 16 Drawing Sheets

FIG.7

| LINE NUMBER | GROUP | FUNCTION | NETWORK TYPE |
|---|---|---|---|
| 01 | A | SPECIAL DELIVERY | PBX |
| ~ | ~ | ~ | ~ |
| 99 | C | ORDINARY DELIVERY | PUBLIC NETWORK |

FIG.8

| SENDER CONDITION | RECEIVER CONDITION | FUNCTIONAL CONDITION |
|---|---|---|
| ON/OFF | ON/OFF | ON/OFF |

FIG.9

| SENDER | GROUP | MAIL SENDING FUNCTION | MAIL STORING POSITION | RECEIPT NUMBER | RECEIPT DATE/TIME | NUMBER OF SHEETS |
|---|---|---|---|---|---|---|
| 0001 | A | SPECIAL DELIVERY | 0X0001 | 0000100 | 91/01/12—12:30 | 4 |
| 1000 | Z | ORDINARY DELIVERY | 0X1001 | 0000200 | 91/01/14—16:30 | 5 |

MANAGEMENT TABLE FOR MANAGING
CALL-ISSUING LINE USED BY SUBSCRIBER            32

| SUBSCRIBER ID | CALL-ISSUING LINE GROUP USED | NETWORK USED |
|---|---|---|
| 01 | A | PBX |
| 02 | B | PBX |
| 99 | C | PBX |

FIG. 10B

LINE GROUP DEFINITION TABLE                    7

| LINE NUMBER | GROUP | FUNCTION | NETWORK TYPE |
|---|---|---|---|
| 01 | A | SPECIAL DELIVERY | PBX |
| 02 | B | ORDINARY DELIVERY | PBX |
| 03 | C | ORDINARY DELIVERY | PBX |

FIG. 10C

CALL-ISSUING-SELECTION CONDITION
DEFINITION TABLE                               6

| SENDER CONDITION | RECEIVER CONDITION | FUNCTIONAL CONDITION |
|---|---|---|
| ON | OFF | OFF |

FIG. 12A

MANAGEMENT TABLE FOR MANAGING
CALL-ISSUING FUNCTION USED BY SUBSCRIBER 32

| SUBSCRIBER ID | CALL-ISSUING LINE GROUP USED | NETWORK USED |
|---|---|---|
| 01 | A | PBX |
| 02 | B | PBX |
| 99 | C | PBX |

FIG. 12B

LINE GROUP DEFINITION TABLE 7

| LINE NUMBER | GROUP | FUNCTION | NETWORK TYPE |
|---|---|---|---|
| 01 | A | SPECIAL DELIVERY | PBX |
| 02 | B | TIME SPECIFIED DELIVERY | PBX |
| 03 | C | ORDINARY DELIVERY | PBX |

FIG. 12C

CALL-ISSUING LINE SELECTION CONDITION DEFINITION TABLE 6

| SENDER CONDITION | RECEIVER CONDITION | FUNCTIONAL CONDITION |
|---|---|---|
| OFF | OFF | ON |

FIG. 14A

MANAGEMENT TABLE FOR MANAGING
CALL-ISSUING LINE USED BY SUBSCRIBER       32

| SUBSCRIBER ID | CALL-ISSUING LINE GROUP USED | NETWORK USED |
|---|---|---|
| 01 | A | PBX |
| 02 | B | PBX |
| 99 | C | PBX |

FIG. 14B

LINE GROUP DEFINITION TABLE       7

| LINE NUMBER | GROUP | FUNCTION | NETWORK TYPE |
|---|---|---|---|
| 01 | A | SPECIAL DELIVERY | PBX |
| 02 | B | TIME SPECIFIED DELIVERY | PBX |
| 03 | C | ORDINARY DELIVERY | PBX |

FIG. 14C

CALL-ISSUING LINE SELECTION CONDITION
DEFINITION TABLE       6

| SENDER CONDITION | RECEIVER CONDITION | FUNCTIONAL CONDITION |
|---|---|---|
| OFF | ON | OFF |

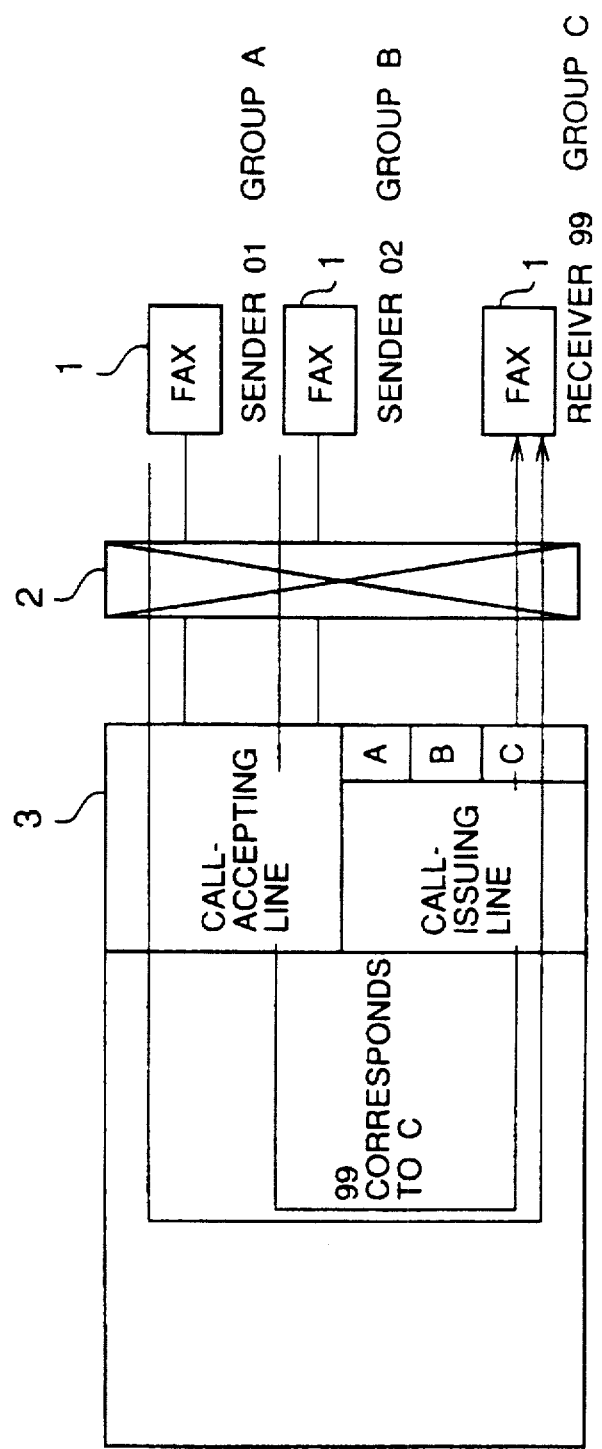

FIG.17

| LINE NUMBER | GROUP |
|---|---|
| 01 | A |
| 02 | A |
| 03 | A |
| ⋮ | ⋮ |
| 41 | C |

FACSIMILE MAIL APPARATUS

This application is a continuation of application Ser. No. 08/509,796, filed Aug. 1, 1995, now abandoned which is a continuation of application Ser. No. 08/030,006, filed as PCT/JP92/00909 Jul. 19, 1992 published as WO93/02515 Feb. 4, 1993, now abandoned.

FIELD OF THE INVENTION

The present invention relates to a facsimile mail apparatus having a mail service function for facsimile information.

BACKGROUND ART

It has recently become general practice that a facsimile mail apparatus (mail center) is connected to exchanges including a PBX (Private Branch Exchange) or to a public network so as to constitute a facsimile mail system for a particular company or an area.

In such a system, a facsimile apparatus effects a centralized control of such functions as confidential delivery, time-specified delivery, or broadcast delivery. In such a facsimile mail apparatus, a large number of lines needs to be made available for connecting an exchange and a facsimile mail apparatus, in proportion to an increasing number of facsimile terminals connected via an exchange and an increasing number of broadcast deliveries.

In a system based on a conventional technology, however, call-issuing lines (sending lines) from a facsimile mail apparatus to an exchange are shared by a sending end and a receiving end, irrespective of functions employed, i.e., a special delivery function, a confidential delivery function, or a broadcast delivery function.

This has caused call-issuing lines to be occupied by a current delivery in the case of a broadcast delivery addressed to a large number of destinations, thereby preventing other requested mail from being delivered until the current delivery is completed.

It could also happen in the conventional technology that a special delivery function is not fully taken advantage of in that a requested special delivery mail is delayed when all the call-issuing lines are occupied by other communication.

The conventional technology also has a disadvantage in that, when a plurality of companies, offices, or departments are grouped together in sharing a center (a facsimile mail apparatus), each group is not always granted an equal chance of using the service in the case that the quantity of mail differs from group to group.

Further, it has been impossible with a conventional system to allow a single center (a facsimile mail apparatus) to deal with cases where public networks and PBX networks are both present in a system, such cases having been dealt with by a complex system or a process whereby separate centers are provided for each different kind of network so as to allow communication to take place between the centers.

SUMMARY OF THE INVENTION

The present invention is accomplished in consideration of the above-described disadvantages, and an object of the present invention related to a facsimile apparatus is to improve efficiency in delivery of facsimile mails, by flexibly determining lines to be used, in due consideration for conditions at a sending end and a receiving end and for conditions arising from various functions.

The above object of the present invention can be achieved by a facsimile mail apparatus having a configuration such that the apparatus is connected to an exchange governing a plurality of facsimile terminals via a plurality of sending lines and a plurality of receiving lines, the apparatus comprising: storage means for storing management information indicating which of a plurality of sending line groups, defined according to a predetermined condition, the plurality of sending lines belong to; and delivery management means for determining a sending line group to be used when sending facsimile information to a plurality of facsimile terminals, by referring to the management information stored in the storage means.

BRIEF DESCRIPTION OF THE DRAWINGS

FIG. 7 shows contents of a line group definition table in an embodiment;

FIG. 8 shows contents of a call-issuing line selection condition definition table in an embodiment;

FIG. 9 shows contents of a delivered mail registration table in an embodiment;

FIGS. 10A–10C show contents of tables, in an embodiment, when a call-issuing line is selected according to a sender condition;

FIGS. 12A–12C show contents of tables, in an embodiment, when a call-issuing line is selected according to a condition arising from a requested function;

FIGS. 14A–14C show contents of tables, of an embodiment, when a call-issuing line is selected according to a receiver condition;

FIG. 15 illustrates a delivery channel for a facsimile mail, in an embodiment, corresponding to the above-mentioned FIG. 13;

FIG. 17 shows a line/group correspondence table for defining a line and a group to which the line belongs.

BEST MODE OF CARRYING OUT THE INVENTION

Figure 1:
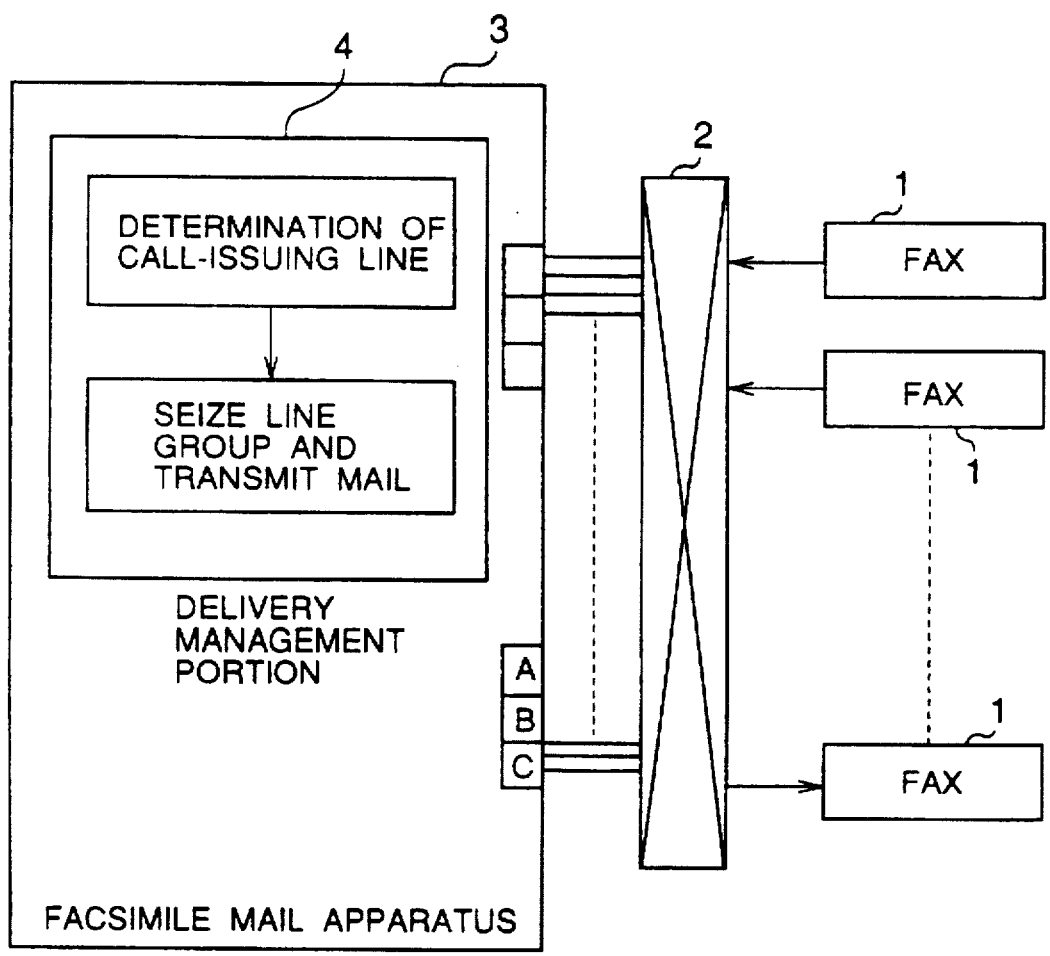
FIG. 1 illustrates the principle of the present invention.

FIG. 1 is a block diagram illustrating an outline of the present invention. A facsimile mail system illustrated comprises an exchange 2, such as a PBX, to which is connected a plurality of facsimile terminals 1, and also comprising a facsimile mail apparatus 3. A plurality of sending (call-issuing) lines and a plurality of receiving (call-accepting) lines connect the exchange 2 and the facsimile mail apparatus 3. The sending lines are divided into at least two line groups. A delivery management portion 4 in the facsimile mail apparatus 3 assigns a line group for each facsimile terminal 1, subscriber, or mail function, on the basis of which assignment the line group to be used is determined from among the above-mentioned sending lines.

The facsimile mail apparatus 3 assigns a line group to be used in transmission such that one or a combination of more than one conditions, i.e., a sender condition, a receiver condition, and a functional condition, are taken into consideration in assigning a particular line group to be used in transmission. The apparatus determines, in determining a line group in a given situation, which condition or combination of conditions has priority. That is, the present invention can allow particular line groups to remain available for special delivery mails even when a broadcast delivery is proceeding, by assigning line groups of the facsimile mail apparatus 3 according to specific conditions.

Alternatively, a line group is registered for each facsimile terminal 1 or each subscriber, and a priority is given either to the line group registered at a sending end or the line group registered at a receiving end. Assignment of line groups can also be according to the kinds of mail functions such as special delivery, confidential delivery, or broadcast delivery functions.

A detailed description will be given below of an embodiment of the present invention.

Figure 2:
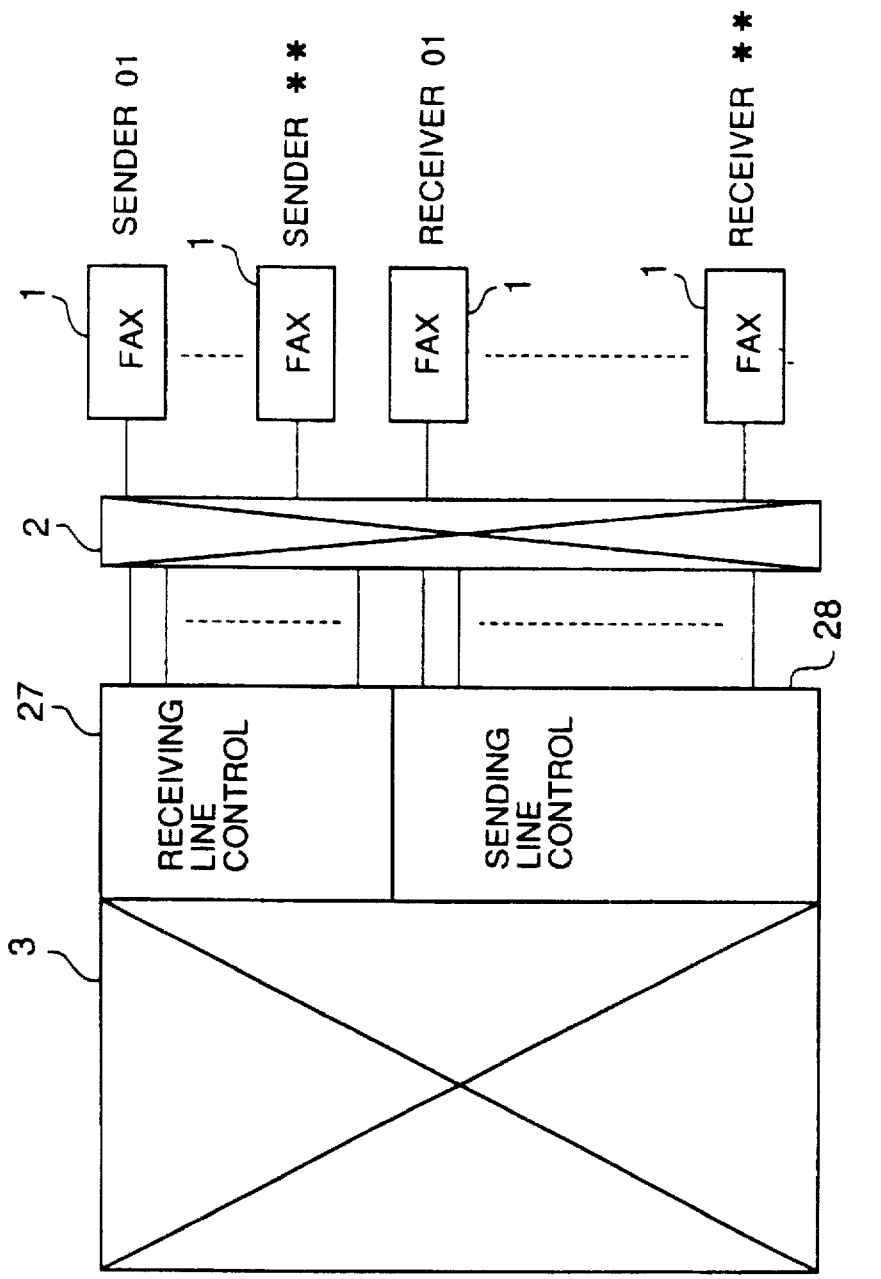
FIG. 2 is a block diagram illustrating connections in the facsimile mail apparatus of an embodiment of the present invention.

FIG. 2 illustrates connections between the facsimile apparatus 3 and the exchange 2. As shown in FIG. 2, the facsimile mail apparatus 3 constitutes a mail center by being connected to the exchange 2 either for a PBX or for a public network. A plurality of facsimile terminals 1 or telephone sets, for example, are connected, in addition to the facsimile mail apparatus 3, to the above-mentioned exchange 2. The facsimile mail apparatus 3 comprises a receiving line control portion 27 and a sending line control portion 28. The receiving line control portion 27 governs receiving lines between the exchange 2 and the facsimile mail apparatus 3. The receiving line transfers facsimile information from the facsimile terminal 1. A sending line control portion 28 governs sending lines between the exchange 2 and the facsimile mail apparatus 3. A sending line transfers facsimile information from the facsimile mail apparatus 3.

Figure 3:
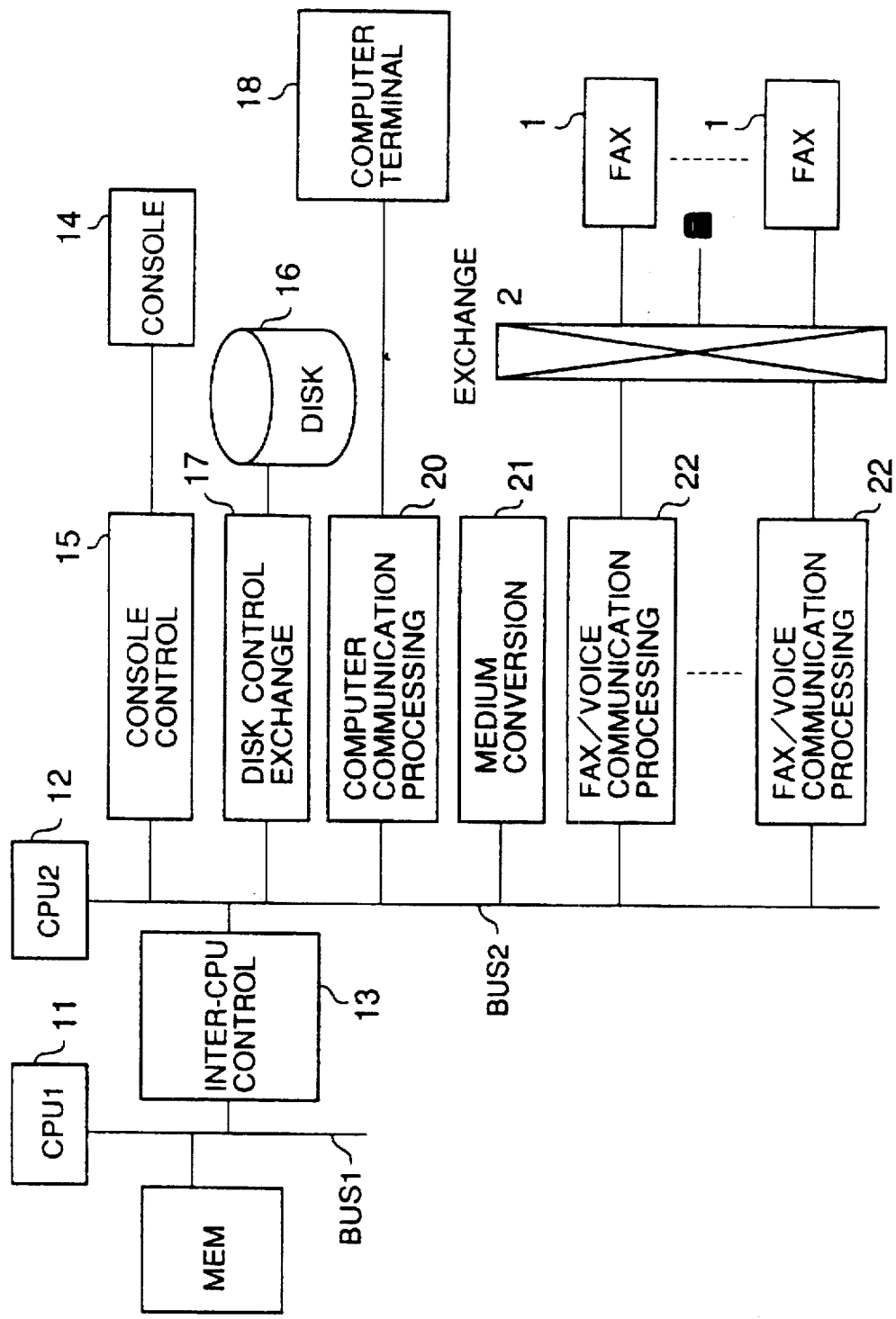
FIG. 3 is a block diagram illustrating a hardware configuration of the facsimile mail apparatus of an embodiment of the present invention.

FIG. 3 is a block diagram illustrating a configuration of the facsimile mail apparatus 3. The facsimile mail apparatus 3 mainly comprises a first main processor 11 for managing input/output of a memory MEM, and a second main processor 12 for managing a control system described below. An inter-processor control portion 13 is inserted between the central bus BUS 1 and the central bus BUS 2 of the main processors 11 and 12 respectively.

Components connected to the central bus BUS 2 of the second main processor 12 constitute a control system of the facsimile mail apparatus 3. This central bus BUS 2 is connected to a console control portion 15 for controlling a console 14 such as a CRT, a disk control portion 17 for controlling a magnetic disk drive 16, a computer communication processing portion 20 for controlling communication with a computer terminal 18 disposed in a remote place, and a medium converting portion 21.

The central bus BUS 2 of the second main processor 12 and the exchange 2 are connected via a plurality of FAX/voice communication processing portions 22. The medium converting portion 21 has the function of converting character codes sent from the computer terminal 18 via the computer communication processing portion 20 into character images, or superposing the images on a predetermined slip form.

Figure 4:
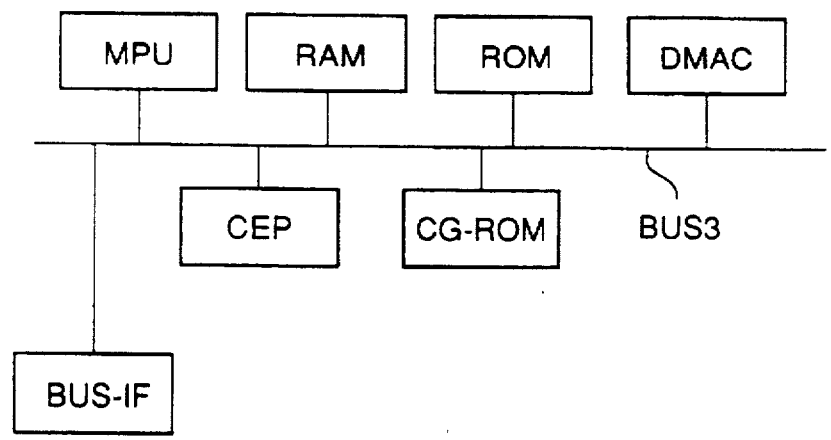
FIG. 4 is a block diagram illustrating a configuration of a medium converting portion of an embodiment of the present invention.

As shown in FIG. 4, the medium converting portion 21 comprises a micro processor MPU and a medium converting bus BUS 3. This medium converting bus BUS 3 is connected to memories RAM and ROM, a data transfer processing portion DMAC, a facsimile code information processing portion CEP, and a character font memory CG-ROM which stores character fonts. A central bus interface BUS-IF controls data input/output between the central bus BUS 3 and the central bus BUS 2.

Figure 5:
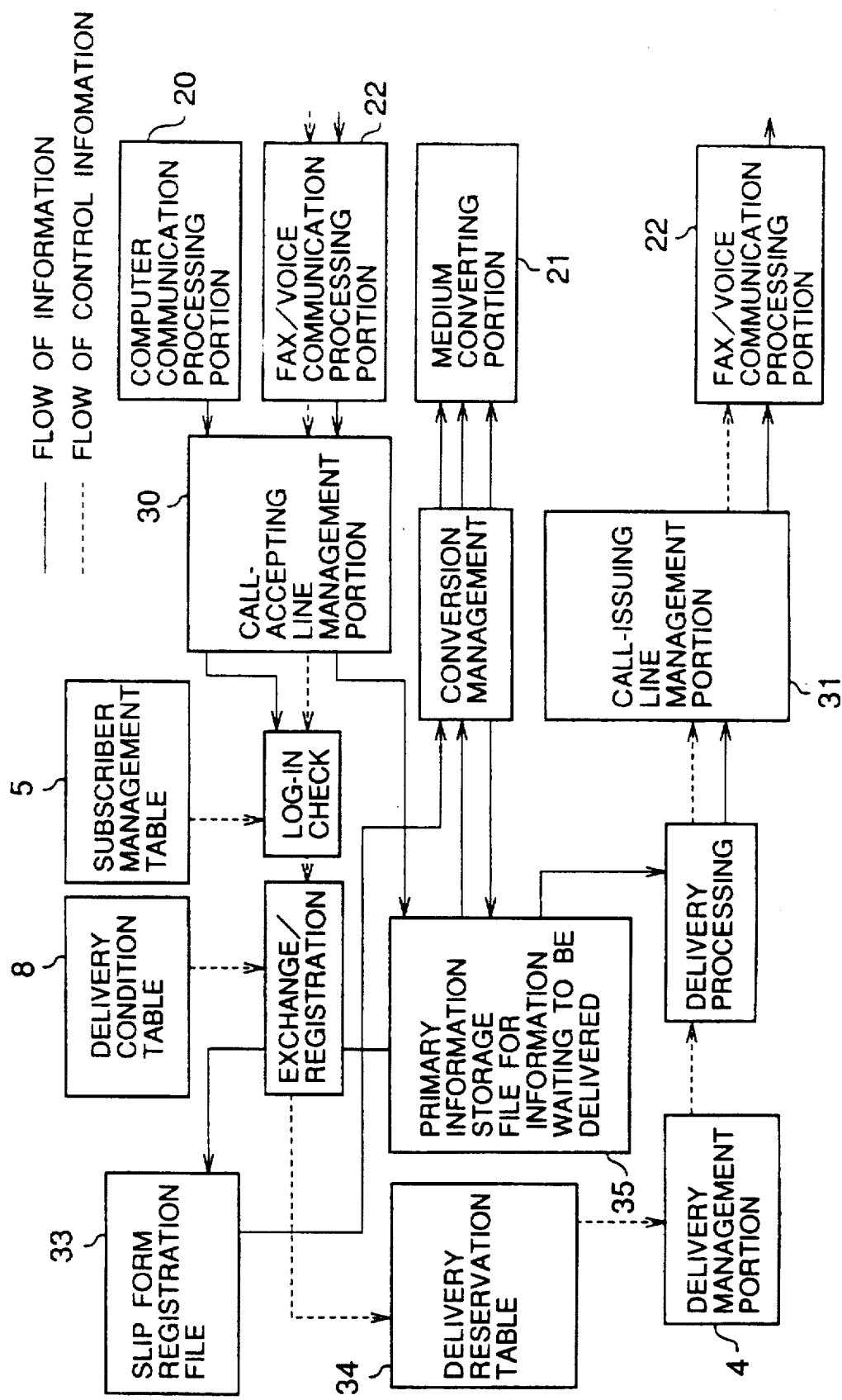
FIG. 5 is a functional block diagram illustrating a flow of facsimile data and control information in a facsimile delivery in an embodiment.
Figure 6:
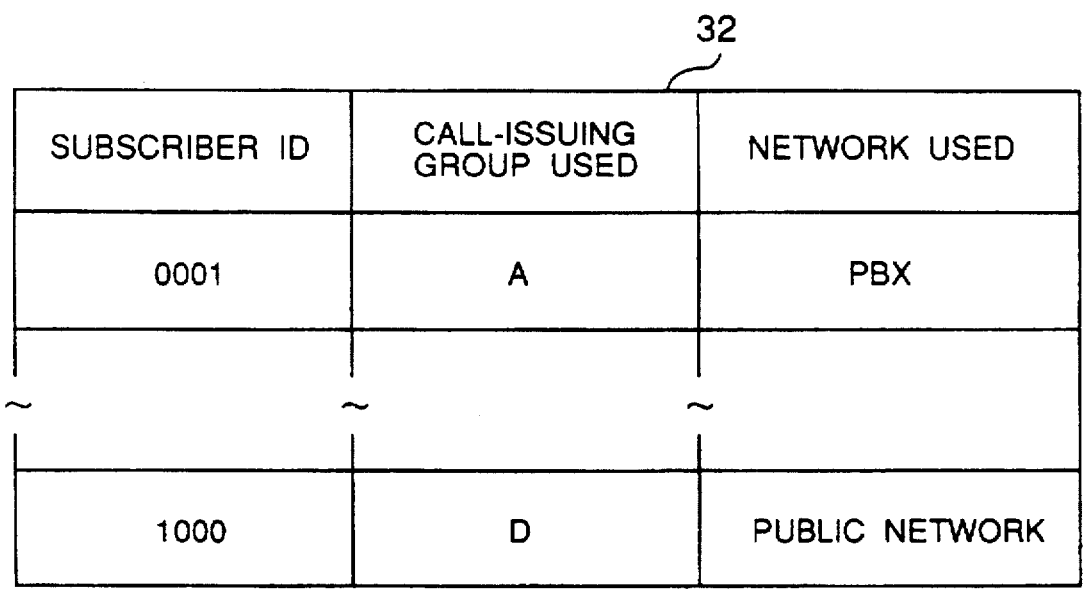
FIG. 6 shows contents of a management table, in an embodiment, for managing the call-issuing line used by a subscriber.

The internal configuration of the facsimile mail apparatus 3 viewed from a functional viewpoint is as shown in FIG. 5. A call-accepting line management portion 30 and a call-issuing line management portion 31 manage the call-accepting (receiving) lines and the call-issuing (sending) lines from the exchange 2 respectively, in such a manner that the lines are divided on the basis of line groups as registered in a subscriber management table 5 described later. The subscriber management table 5 (a management table 32 for managing the call-issuing line used by a subscriber) has a format shown in FIG. 6 and accomodates registration of subscriber identification numbers (subscriber IDs), call-issuing lines used, and networks used. A delivery condition table 8 consists of a line group definition table 7 and a call-issuing line selection condition definition table 6 shown in FIGS. 7 and 8 respectively. The following kinds of information are registered in the line group definition table 7: line numbers corresponding to physical lines, group names of groups to which the lines belong; names of functions including special delivery, broadcast delivery, and confidential delivery functions; names of network types such as a PBX and a public network. The call-issuing line selection condition definition table 6 allows selection of a condition when selecting a line, the condition being either: a condition set at a sending end (sender condition ON), a condition set at a receiving end (receiver condition ON), or a condition arising from the usage of special delivery, broadcast delivery, or confidential delivery functions (functional condition ON). The call-issuing line selection condition definition table 6 can be used in selecting only one condition from among the sender condition, the receiver condition, and the functional condition. The selection of a line group can be such that an order of priority is set: for example, functional condition→sender condition→receiver condition. The subscriber management table 5 and the delivery condition table 8 are set by hardware means in the magnetic disk drive 16 in FIG. 2.

A slip form registration file 33 in FIG. 5 accomodates registration of a slip form, for example, which form is registered using a vector font or a dot image. Numerical codes, for example, received in a computer communication are overlaid onto that form and are output.

As shown in FIG. 9, a delivery reservation table 34 in FIG. 5 accomodates registration of a sender ID, a line group name, a mail sending function, a mail storing position, a receipt number, a receipt date/time, and a number of sheets. The mail storing position indicates an address within the aforementioned magnetic disk drive 16, and the receipt number is registered as a serial number.

A description will be given next of a procedure for a facsimile delivery with reference to the aforementioned FIG.

5. First, when data or control information is received by a call-accepting line management portion 30 via the computer communication processing portion 20 or the FAX/voice communication processing portion 22, a log-in check on the data or the control information is carried out by referring to the subscriber management table 5. At this stage, subscriber IDs, at the sending and receiving ends, as well as the line group are checked.

Subsequently, the delivery condition table 8 is referred to, and a determination is made as to which of the following conditions is to be used in determining the line group to be used in issuing a call: the sender condition; the receiver condition; or the functional condition. Specifically, this is achieved by first referring to the call-issuing line selection definition table 6 (FIG. 8) of the delivery condition table 8, and confirming which of the conditions is set ON. Once the set condition is confirmed, the management tables are referred to.

A description will be given below of different cases of line group selection.

(1) A case where the call-issuing line group is selected on the basis of the sender condition.

In this case, the sender condition is set ON in the call-issuing line selection definition table 6 (FIG. 10(c)), and once this setting is confirmed, the management table 32 for managing the call-issuing line used by a subscriber (FIG. 10(a)) is referred to, so as to determine, on the basis of the call-issuing line groups registered therein, the line group to be used when issuing a call.

Figure 11:
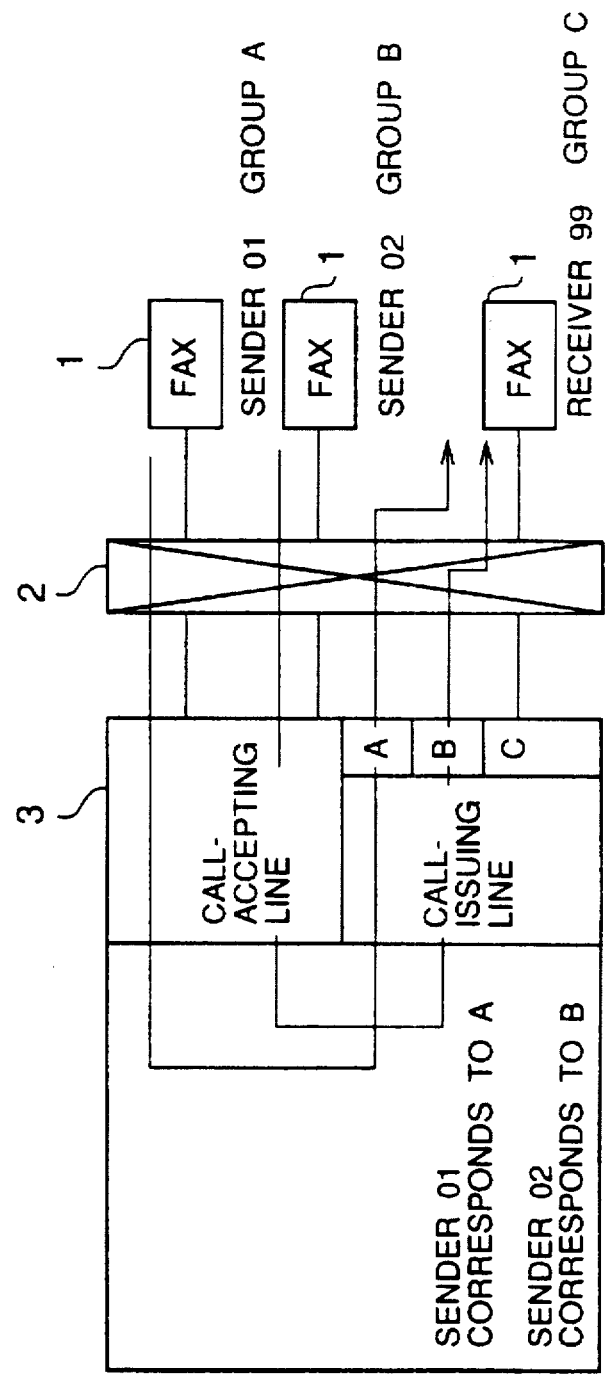
FIG. 11 illustrates a delivery channel for a facsimile mail, in an embodiment, corresponding to the above-mentioned FIG. 9.

Describing the above process in detail with reference to FIG. 11, when a sender 01 sends a facsimile mail to a receiver 99, line group A is allocated as a call-issuing line 26, since it is determined, by referring to the management table 32 for managing the call-issuing line used by a subscriber (FIG. 10(a)), that the call-issuing group to be used by this sender 01 is the group A. The mail is then delivered to the receiver 99. On the other hand, in a case where a sender 02 sends a facsimile mail to the receiver 99, the management table 32 for managing the call-issuing line used by a subscriber (FIG. 10(a)) shows that the call-issuing line group to be used by the sender 02 is group B, so that the group B is allocated as the call-issuing line 26, and the mail is delivered to the receiver 99.

(2) A case where the call-issuing line group is selected on the basis of the condition arising from the requested function.

Figure 13:
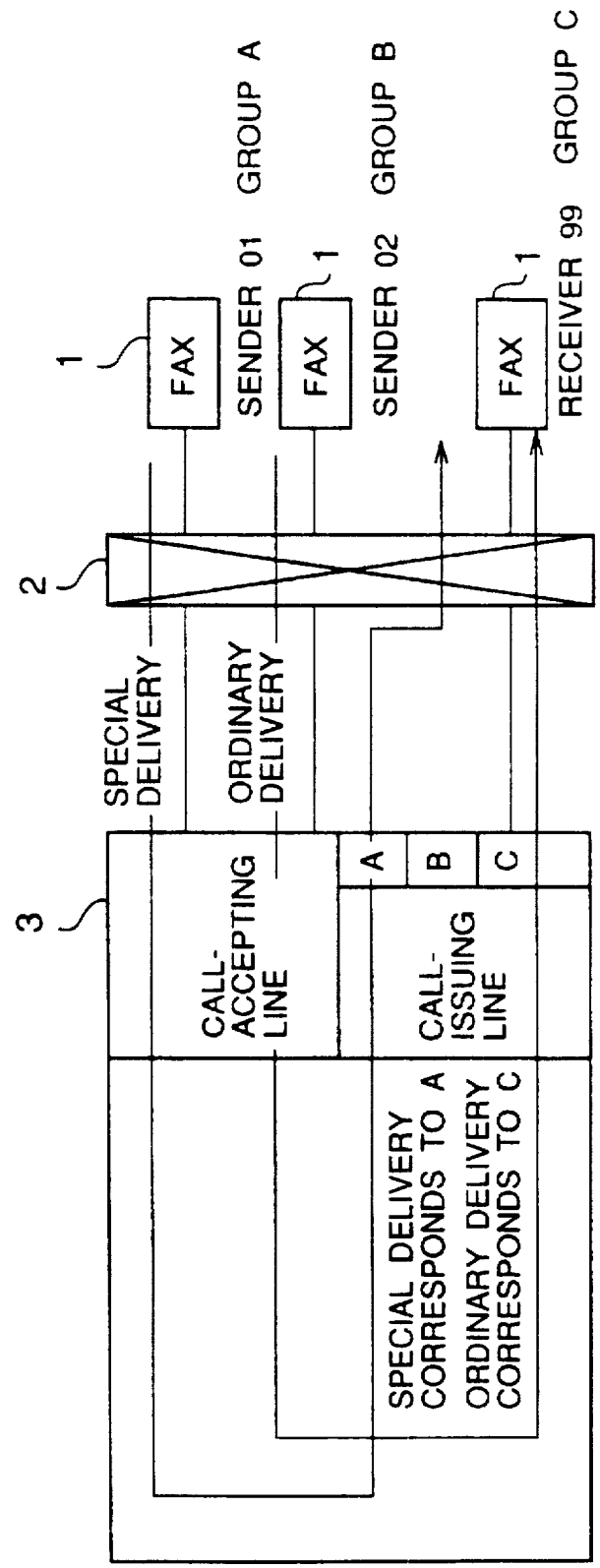
FIG. 13 illustrates a delivery channel for a facsimile mail, in an embodiment, corresponding to the above-mentioned FIG. 11.

In this case, the functional condition is set ON in the call-issuing line selection condition definition table 6 (FIG. 12(a)). After confirming a facsimile mail function, the line group definition table 7 (FIG. 12(b)) is referred to. In a case where the sender 01 sends a special delivery facsimile mail to the receiver 99, it is found, by referring to the line group definition table 7 (FIG. 12(b)), that the group A is assigned to the special delivery function. Accordingly, as shown in FIG. 13, the special delivery mail from the sender 01 is delivered to the receiver 99 after the group A is allocated as the call-issuing line 26.

In a case where the sender 02 sends an ordinary delivery facsimile mail to the receiver 99, it is found, by referring to the line group definition table 7 (FIG. 12(b)), that group C is assigned to the ordinary delivery function. Accordingly, as shown in FIG. 13, the ordinary delivery mail from the sender 02 is delivered to the receiver 99 after the group C is allocated as the call-issuing line 26.

(3) A case where the call-issuing line group is selected on the basis of the receiver condition.

In this case, the receiver condition is set ON in the call-issuing line selection condition definition table 6 (FIG. 10(c)), and once this setting is confirmed, the management table 32 for managing the call-issuing line used by a subscriber (FIG. 10(a)) is referred to, so as to determine, on the basis of the call-issuing line groups registered therein, the line group to be used when issuing a call.

Describing the above process in detail with reference to FIGS. 14 and 15, when the sender 01 sends a facsimile mail to the receiver 99, the line group C is allocated as the call-issuing line 26 and the mail is delivered to the receiver 99, since it is determined, by referring to the management table 32 for managing the call-issuing line used by a subscriber (FIG. 14(a)), that the line group, assigned as the call-issuing line group to be used by the receiver 99, is the group C. Also, when the sender 02 sends a facsimile mail to the receiver 99, the line group C assigned to the receiver 99 is allocated.

Figure 16:
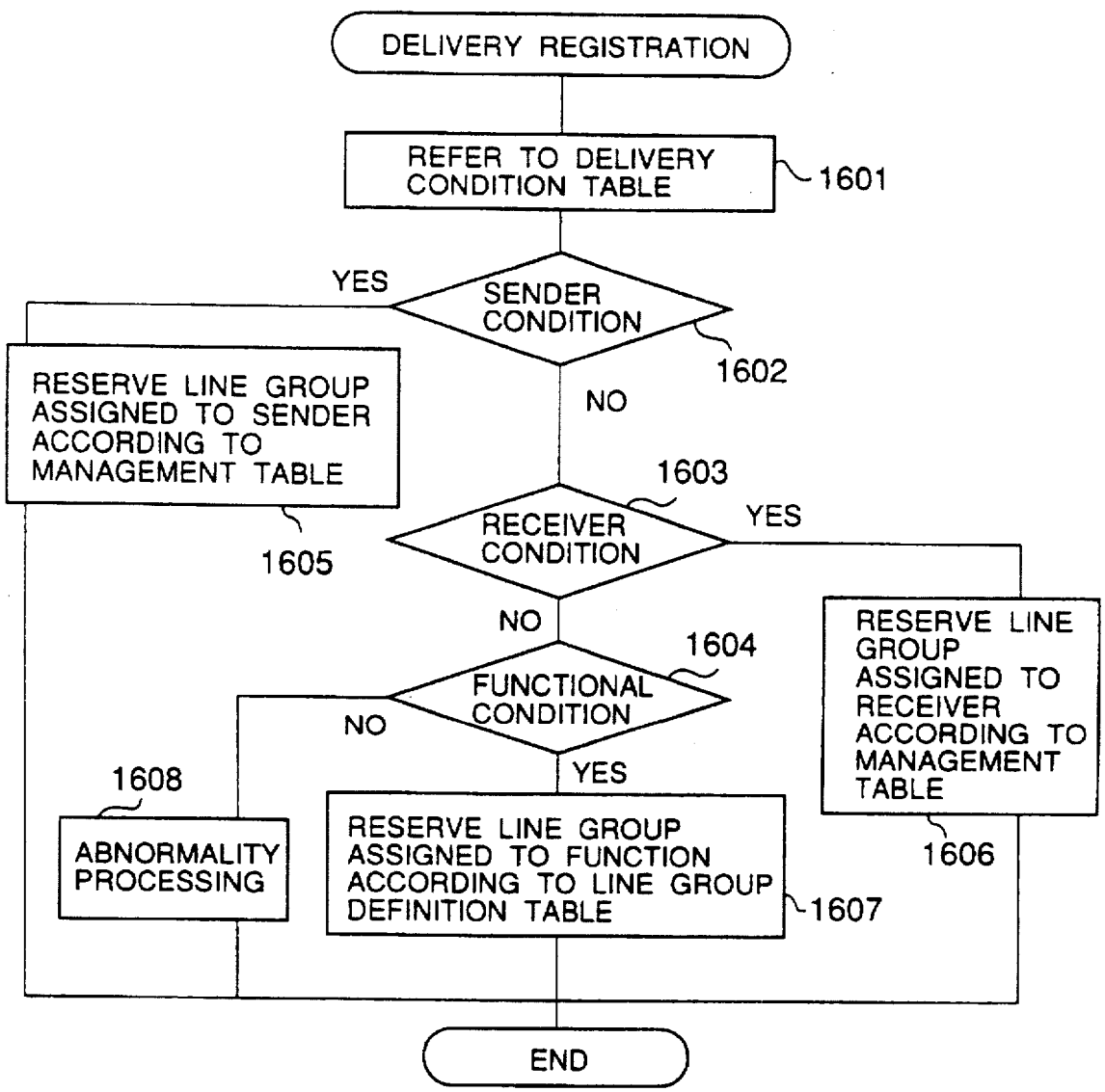
FIG. 16 is a flow chart illustrating a procedure, in an embodiment, for determining a line group to be used.

FIG. 16 is a flow chart depicting the above-described process for setting delivery conditions. The flow chart of FIG. 16 is mainly executed by the second main processor 12. That is, the second main processor 12 first refers to the delivery condition table 8 (step 1601), and a determination is made in a sequential manner as to which of the following conditions the line selection should be based on: the sender condition (1602); the receiver condition (1603); or the functional condition (1604). When it is determined that the sender condition is fulfilled, the second main processor 12 reserves the line group assigned to the subscriber (sending end) after referring to the management table 32 for managing the call-issuing line used by a subscriber (FIG. 6) (1605). When it is determined that the receiver condition is fulfilled, the second main processor 12 reserves the line group assigned to the subscriber (receiving end) after referring to the management table 32 for managing the call-issuing line used by a subscriber (FIG. 6) (1606).

When it is determined that the functional condition is fulfilled, the second main processor 12 reserves the line group assigned to the relevant function, after referring to the line group definition table 7 (1607). When it is determined that neither the sender condition, the receiver condition, nor the functional condition is fulfilled, a condition of management table abnormality, for example, is determined to exist, and abnormality processing is carried out (1608).

The facsimile mail for which the line group is determined is stored in a primary information storage file 35 shown in FIG. 5, which file is provided for information waiting to be delivered. Control information such as related to the line group is registered in the aforementioned delivery reservation table 34 described along with FIG. 9.

When a facsimile mail is a slip, for example, and an overlay of a slip form containing lines or diagrams is needed, a form is fetched from the slip form registration file 33 to be integrated with character codes. The result of this superposition is converted into image data by the medium converting portion 21, and is re-stored in the above-mentioned primary information storage file 35. The above-mentioned facsimile data is read, under the control of the delivery management portion 4, on the basis of the control information in the delivery reservation table 34, and is output via the call-issuing line management portion 31.

The reserved line group determined on the basis of the aforementioned control information is employed as the call-issuing line 26.

While the above description assumes a case, for example, where each of the groups A–B comprises 14 call-issuing lines 26, the total being 42 lines, it is not necessary that an equal number of lines is assigned to each of these groups. When priority is given to the functional condition, division can be such that the group A assigned to special delivery comprises 10 lines, the group B assigned to time-specified delivery comprises 10 lines, and the group C assigned to ordinary delivery comprises 22 lines. The line and the group to which the line belongs are defined in accordance with a line-group correspondence table 10 shown in FIG. 17, and a renewal of this table is required when reorganizing the line groups.

The renewal of the table can also be such that the table is renewed after a predetermined period of time during which the usage status of each of the call-issuing lines 26 is monitored. The number of lines assigned can be different from one time period to another because there is a time period, for example, during the morning, when demands for broadcast deliveries are exceedingly heavy and there is a time period when demands are not so heavy.

Figure 17:
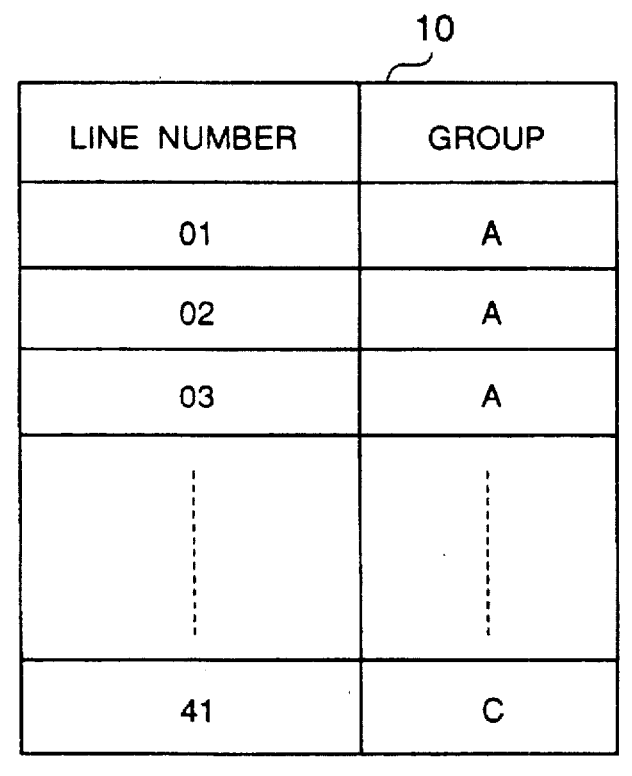

While FIG. 17 shows that the line groups include three groups A–C, all the call-issuing lines 26 can belong to the group A, as necessary.

Information necessary when effecting the renewal/write operation can be input via the computer terminal 18. The above-mentioned renewal/write operation is mainly carried out by the second main processor 12.

POSSIBLE INDUSTRIAL APPLICATION

The present invention allows flexible determination of lines to be used, by allocating the line group assigned to each subscriber at a sending or receiving end, or to each function, and by issuing a call from the line thus allocated. Thus, efficiency in facsimile mail delivery can be greatly improved.

I claim:

1. A facsimile mail apparatus, sending a plurality of facsimile mail, which is connected to a network with a plurality of sending lines, the apparatus comprising:

storage means for storing management information indicating correspondence between a plurality of sending line groups and predetermined conditions of said facsimile mail; and delivery management means for determining at least one of the sending line groups to be used to send said facsimile mail by referring to said management information stored in said storage means by means of one of the conditions to be selected when sending said facsimile mail.

2. The facsimile mail apparatus as claimed in claim 1, wherein said storage means comprises condition storage means for storing a sender condition specifying which line group should be used in sending information to a receiving end, wherein the sender condition is based on which facsimile terminal sends said facsimile information.

3. The facsimile mail apparatus as claimed in claim 1, wherein said storage means comprises condition storage means for storing a receiver condition specifying which line group should be used in sending information to the receiving end, wherein the receiver condition is based on which facsimile terminal receives said facsimile information.

4. The facsimile mail apparatus as claimed in claim 1, wherein said storage means comprises condition storage means for storing a functional condition specifying which line group should be used in sending information to a receiving end, wherein the functional condition is based on said facsimile information.

5. The facsimile mail apparatus as claimed in claim 1, wherein said storage means comprises condition storage means for storing: a sender condition specifying, depending on which facsimile terminal and facsimile information is sent from, which line group should be used in sending information to a receiving end; a receiver condition specifying, depending on which facsimile terminal said facsimile information is sent to, which line group should be used in sending information to the receiving end; and a functional condition specifying, depending on the characteristics of said facsimile information to be sent, which line group should be used in sending information to a receiving end.

6. The facsimile mail apparatus as claimed in claim 5, wherein said storage means comprises condition selection storage means for storing selection information specifying which of the following conditions should be employed, the sender condition, the receiver condition, or the functional condition.

7. The facsimile mail apparatus as claimed in claim 6, wherein said delivery management means comprises determining means for determining the sending line group to be used on the basis of a condition specified in said condition selection storage means.

8. The facsimile mail apparatus as claimed in claim 1, further comprising renewing means for enabling group reorganization by renewing said management information stored in said storage means.

9. The facsimile mail apparatus as claimed in claim 1, wherein said storage means comprises:

a subscriber management table equipped with a subscriber ID registration portion for registering at least identification numbers for a subscriber or for a facsimile terminal, also being equipped with a call-issuing group registration portion for registering a line group name to be used by the IDs registered in the ID registration portion; and a delivery condition table consisting of a call-issuing line selection condition definition table registering which of the following is given priority, a condition set at a sending end, a condition set at a receiving end, or a function registered in said function registration portion, and also consisting of a line group definition table defining a line to be used according to a functional condition, said delivery management means comprising determining means for determining, on the basis of a priority condition specified in said call-issuing line selection condition definition table, by referring to said subscriber management table or line group definition table, a line group to be used from among said call-issuing lines.

10. The facsimile mail apparatus as claimed in claim 9, further comprising: a line/group correspondence table registering correspondences between lines and line groups; and renewal means for reorganizing line groups by renewing correspondences between lines and line groups.

11. The facsimile mail apparatus as claimed in claim 10, wherein said renewal means comprises executing means for allowing said delivery management portion to execute a renewal of said correspondences by referring to the status of usage of sending lines.

12. The facsimile mail apparatus as claimed in claim 10, wherein said renewal means comprises executing means for allowing said delivery management portion to execute a renewal of said correspondences in consideration of the time periods during which a sending line is used.

13. A method of sending a plurality of facsimile mail in a facsimile mail apparatus connected to a network with a plurality of sending lines, comprising:

storing management information identifying the correspondence between a plurality of sending line groups and predetermined facsimile mail conditions; and automatically determining for each item of facsimile mail, at least one of the sending line groups to be used to send the item of facsimile mail based on the stored management information.

* * * * *

UNITED STATES PATENT AND TRADEMARK OFFICE
CERTIFICATE OF CORRECTION

PATENT NO. : 5,757,510
DATED : May 26, 1998
INVENTOR(S) : Akihiro OKADA

It is certified that error appears in the above-identified patent and that said Letters Patent is hereby corrected as shown below:

Title Page, Assignee, change "KANAGAWA" to --KAWASAKI--.

Signed and Sealed this

Sixteenth Day of February, 1999

Attest:

*Attesting Officer*

*Acting Commissioner of Patents and Trademarks*

UNITED STATES PATENT AND TRADEMARK OFFICE
CERTIFICATE OF CORRECTION

PATENT NO.: 5,757,510
DATED       : May 26, 1998
INVENTOR(S): Akihiro OKADA It is certified that error appears in the above-identified patent and that said Letters Patent is hereby corrected as shown below:

On the Title Page, [63] Related U.S. Application Data, please change "July 19, 1992" to --July 16, 1992--.

Column 1, line 6, PCT/JP92/00909 filing date should read --July 16, 1992--

Signed and Sealed this

Sixth Day of April, 1999

Attest:

Q. TODD DICKINSON

*Attesting Officer*     *Acting Commissioner of Patents and Trademarks*